(12) United States Patent
Zhou et al.

(10) Patent No.: US 10,674,081 B2
(45) Date of Patent: Jun. 2, 2020

(54) ILLUMINATION CONTROL TECHNIQUES FOR COLOR AND IR CAMERA SENSORS

(71) Applicant: Advanced Micro Devices, Inc., Sunnyvale, CA (US)

(72) Inventors: Hui Zhou, Shanghai (CN); Chunrong Zhang, Shanghai (CN); Dapeng Liu, Shanghai (CN)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 232 days.

(21) Appl. No.: 15/728,406

(22) Filed: Oct. 9, 2017

(65) Prior Publication Data
US 2019/0082107 A1    Mar. 14, 2019

(30) Foreign Application Priority Data

Sep. 8, 2017    (CN) .......................... 2017 1 0807641

(51) Int. Cl.
| | |
|---|---|
| *H04N 5/232* | (2006.01) |
| *H04N 5/235* | (2006.01) |
| *H04N 5/33* | (2006.01) |
| *H04N 9/04* | (2006.01) |
| *H04N 5/353* | (2011.01) |
| *H04N 5/225* | (2006.01) |

(52) U.S. Cl.
CPC ....... *H04N 5/23245* (2013.01); *H04N 5/2256* (2013.01); *H04N 5/2352* (2013.01); *H04N 5/2353* (2013.01); *H04N 5/2354* (2013.01); *H04N 5/33* (2013.01); *H04N 5/3532* (2013.01); *H04N 9/04553* (2018.08)

(58) Field of Classification Search
CPC ............. H04N 5/23245; H04N 5/2353; H04N 5/2354; H04N 5/33; H04N 5/3532; H04N 9/04553
USPC ........................................................ 348/164
See application file for complete search history.

(56) References Cited

U.S. PATENT DOCUMENTS

| | | | |
|---|---|---|---|
| 2011/0228096 A1* | 9/2011 | Friel ......................... | H04N 5/33 348/164 |
| 2017/0104939 A1* | 4/2017 | Sun .......................... | H04N 5/33 |
| 2017/0286792 A1* | 10/2017 | Ackerman ........... | G06K 9/2027 |

OTHER PUBLICATIONS

Qimaging "Rolling Shutter vs. Global Shutter", 2014.*
(Continued)

*Primary Examiner* — Jamie J Atala
*Assistant Examiner* — Kathleen V Nguyen
(74) *Attorney, Agent, or Firm* — Volpe and Koenig, P.C.

(57) ABSTRACT

Disclosed herein are techniques for camera illuminator control. These techniques can be used in cameras that include an RGBIR (red green blue infrared) camera sensor and two illuminators—one visible light illuminator and one infrared illuminator. The techniques provide timing and control for such cameras for a variety of different camera modes. Particular camera modes may be defined as having different camera mode values for different camera mode parameters. That is, any particular camera mode is defined by a particular camera mode value for each of a set of camera mode parameters. Different parameters include a flash periodicity parameter, a simultaneity parameter, an autoexposure mode parameter, a shutter mode parameter, and a frame drop parameter.

15 Claims, 8 Drawing Sheets

(56) References Cited

OTHER PUBLICATIONS

Qimaging, "Rolling Shutter vs. Global Shutter", Technical Note, 2014, 9 pgs. (Retrieved at https://www.qimaging.com/ccdorscmos/.../RollingvsGlobalShutter.pdf, Sep. 18, 2017).

* cited by examiner

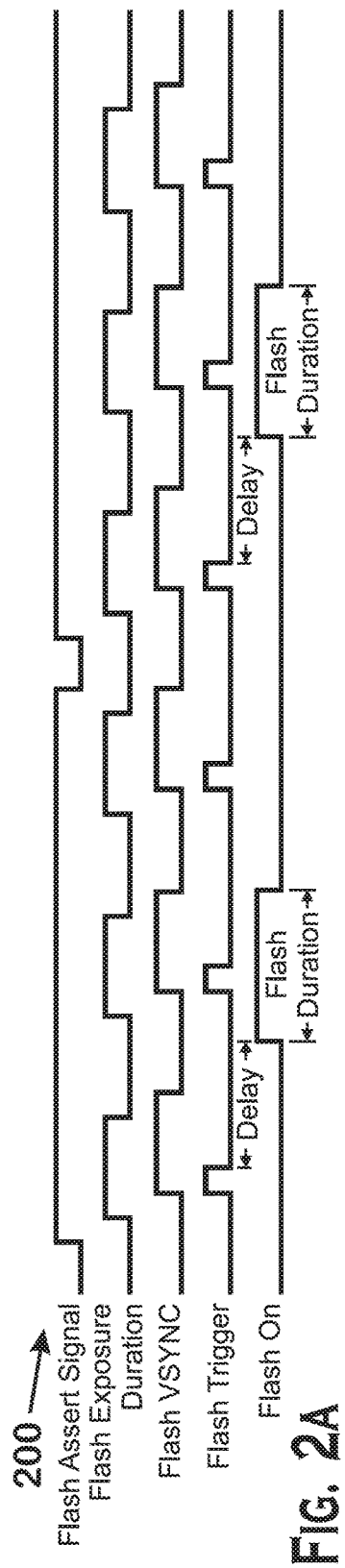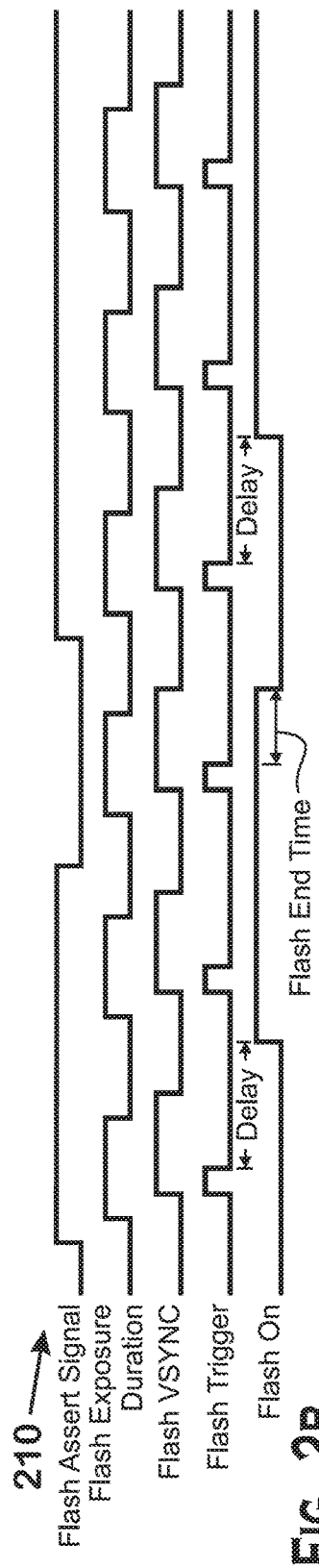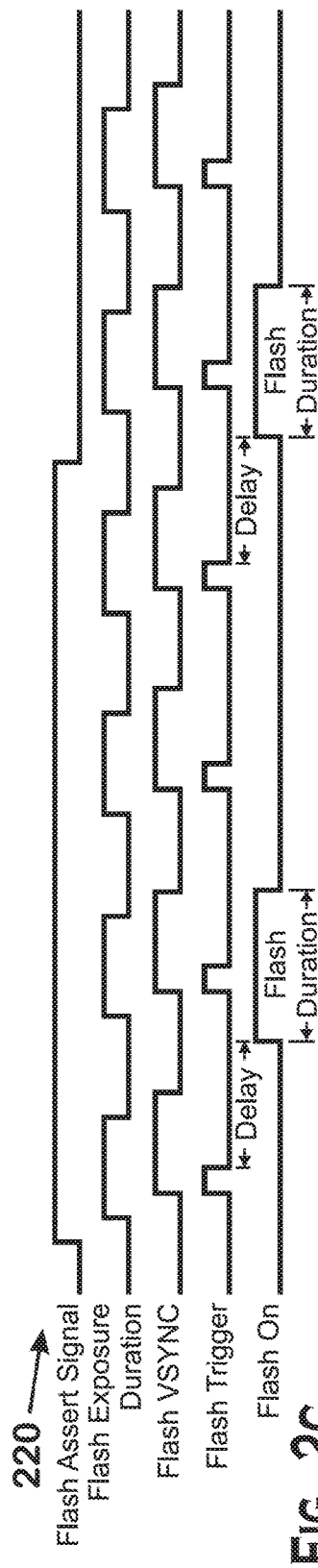

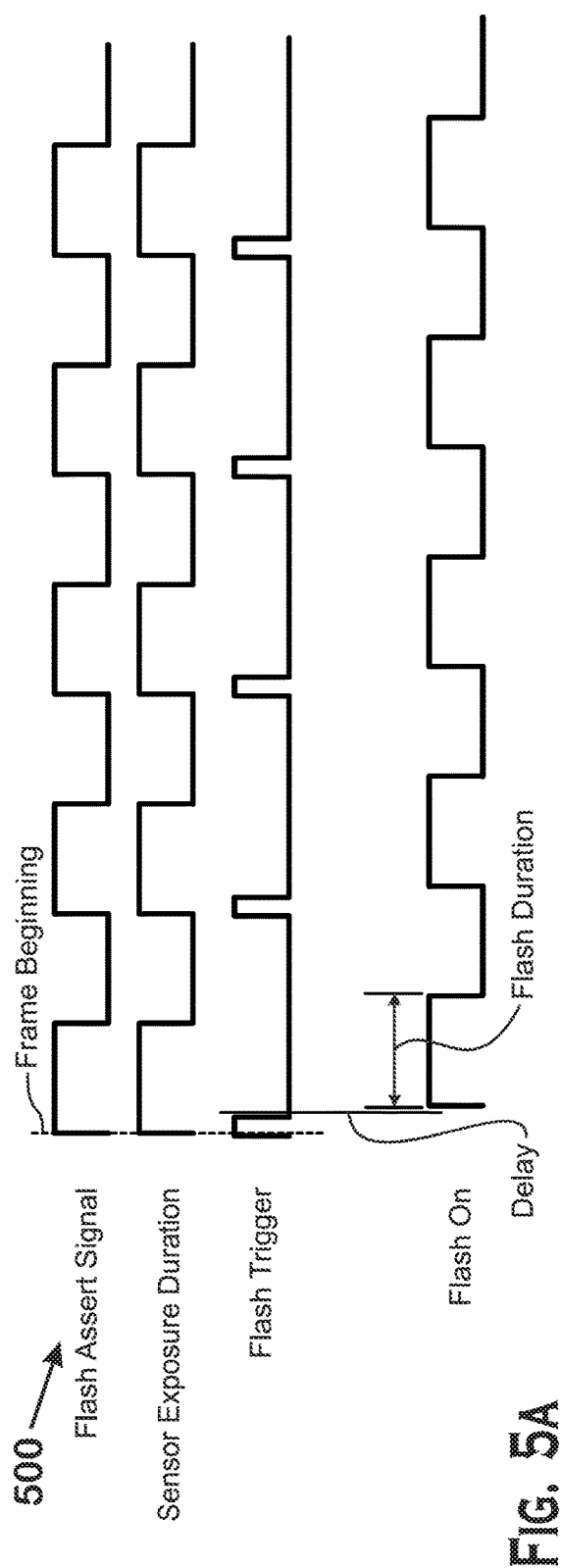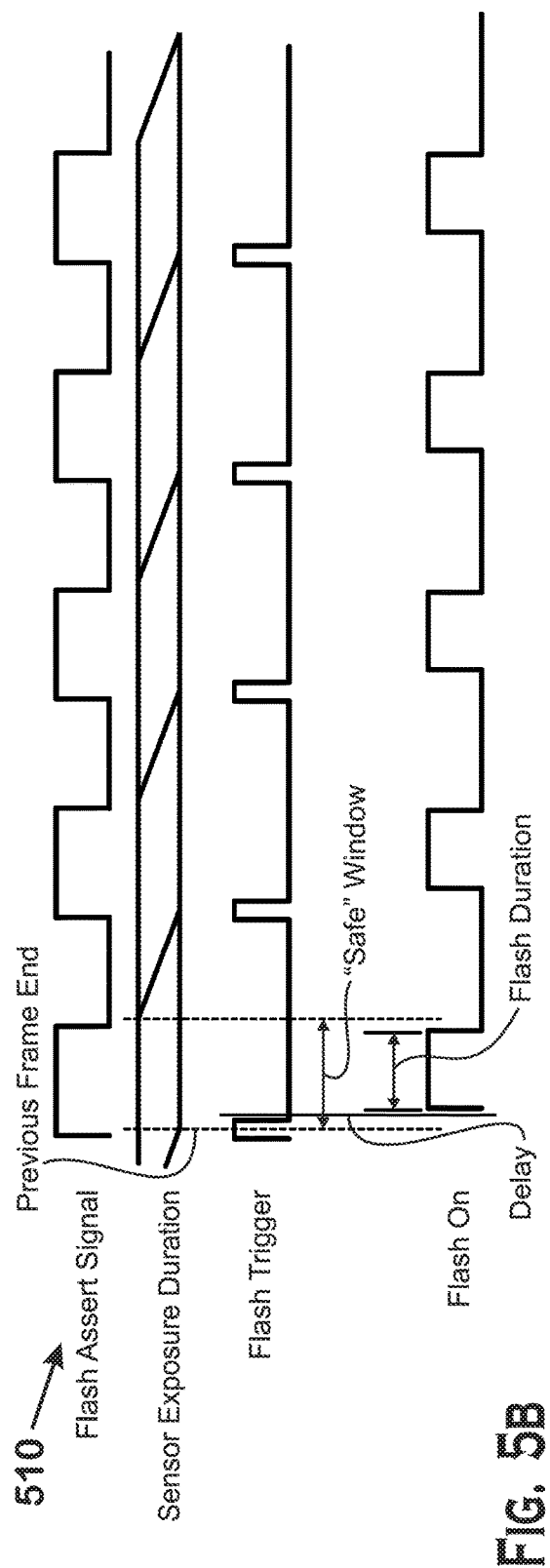
FIG. 5A
FIG. 5B

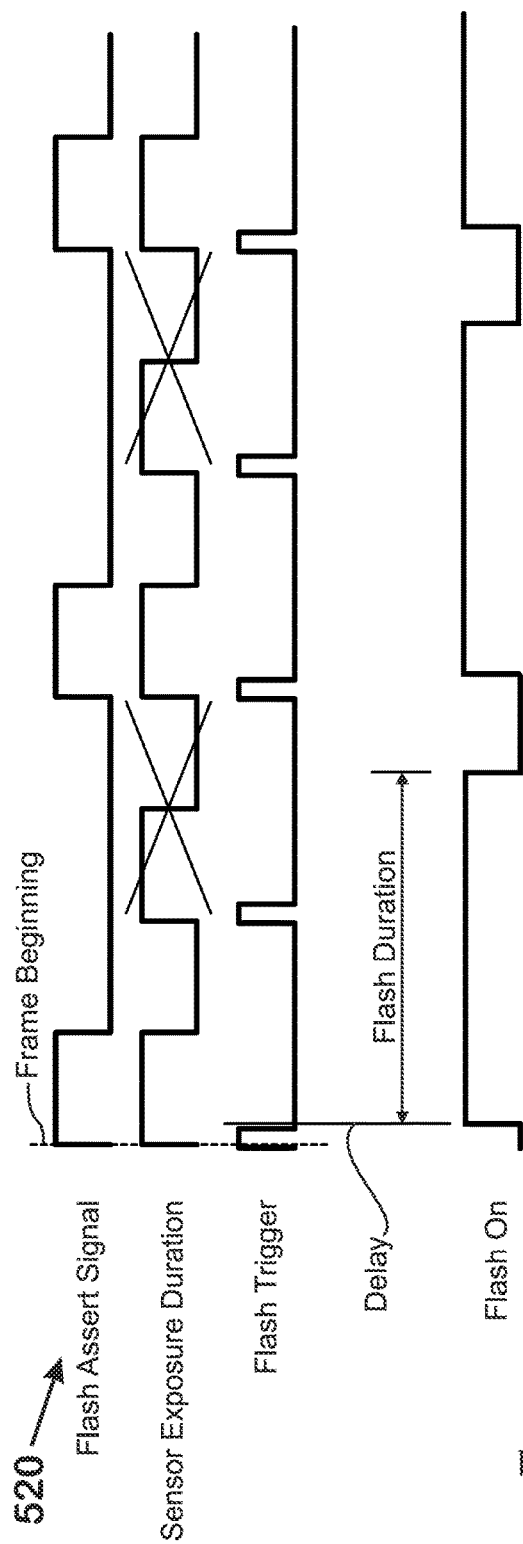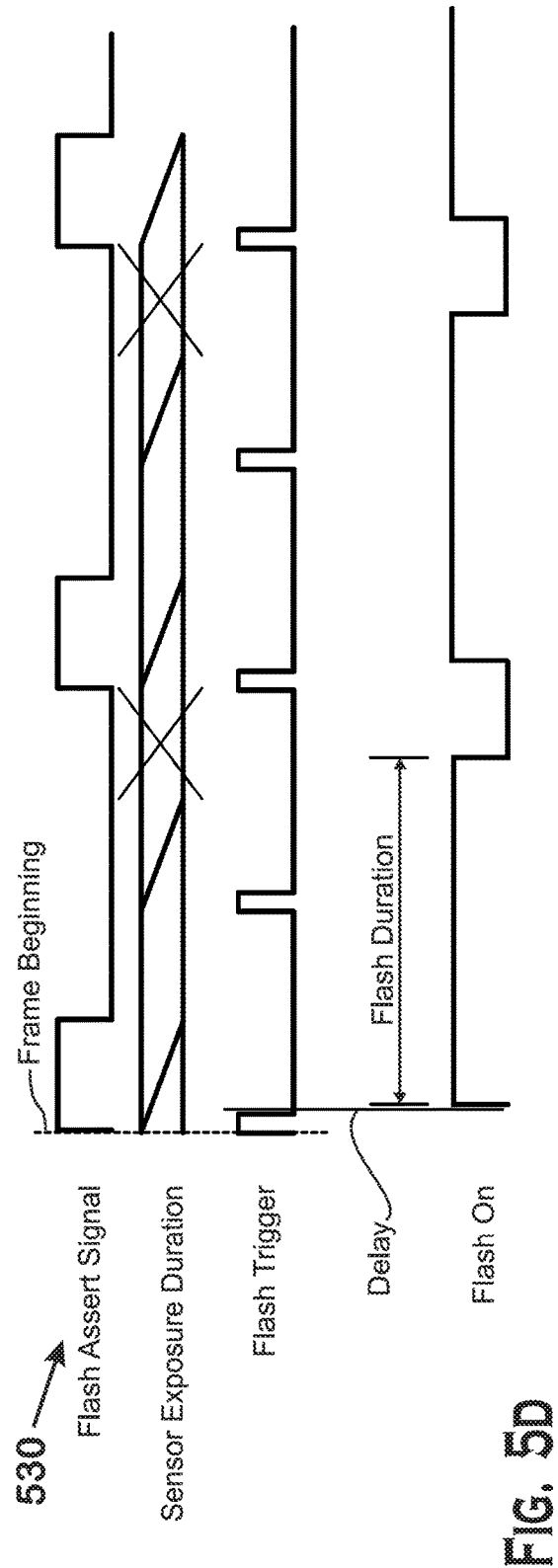

ILLUMINATION CONTROL TECHNIQUES FOR COLOR AND IR CAMERA SENSORS

CROSS REFERENCE TO RELATED APPLICATION

This application claims priority to Chinese Patent Application No. 201710807641.1, filed Sep. 8, 2017, the entire contents of which is hereby incorporated by reference as if fully set forth herein.

BACKGROUND

Cameras are becoming increasingly miniaturized and provided with increased capabilities. Recently, cameras having combined visible light and infrared sensing capability into single sensor chips. Scenes for which images are to be captured sometimes require flash illumination to increase light to an acceptable level. Flash illumination is complicated by the use of combined visible light and infrared sensors.

BRIEF DESCRIPTION OF THE DRAWINGS

FIGS. 2A-2C are timing diagrams illustrating variation of a periodicity camera mode parameter, according to examples;

FIGS. 5A-5D illustrate timing diagrams that include features to align flash timings with exposure duration for the purpose of properly illuminating exposure frames, according to examples.

DETAILED DESCRIPTION

Disclosed herein are techniques for camera illuminator control. These techniques can be used in cameras that include an RGBIR (red green blue infrared) camera sensor and two illuminators—one visible light illuminator and one infrared illuminator. The techniques provide timing and control for such cameras for a variety of different camera modes. Herein, particular camera modes may be defined as having different camera mode values for different camera mode parameters. That is, any particular camera mode is defined by a particular camera mode value for each of a set of camera mode parameters.

One camera mode parameter is the periodicity of flash illumination. The periodicity camera mode parameter determines whether, for any given assertion of a flash enable signal (or "flash assert signal"), an illuminator is switched on once for a single frame, once over multiple frames, or periodically while the flash enable signal is asserted.

Another camera mode parameter is the simultaneity parameter, which determines whether both infrared and RGB data is read from a single frame of exposure of the sensor (referred to as "simultaneous" reading or "dual-output" reading herein) or whether only one of infrared or RGB data is read from a single frame of exposure of the sensor (referred to as "one-output" reading herein). If the simultaneity parameter has the dual-output value, then an additional parameter is the auto-exposure parameter, which determines whether an auto-exposure calculation is performed to determine illumination level for the visible light flash, for the infrared flash, or for both the visible light flash and the infrared flash.

Another camera mode parameter is the shutter mode parameter. The shutter mode parameter determines whether the sensor is read out in a global shutter mode or a rolling shutter mode.

Another camera mode parameter is the frame drop parameter. Due to the timing of the illuminator relative to shutter exposure, and especially for rolling shutter, it may be desirable or useful to drop some frames in a frame stream. In some modes, it may be possible to avoid dropping frames despite the use of a rolling shutter. The frame drop parameter dictates whether frames of a frame stream are discarded.

As stated above, the camera with an RGBIR sensor and two illuminators may operate in a variety of modes, each mode defined by a different parameter value for each of a set of different camera mode parameters. Some parameters may have any value regardless of the value of other parameters, while for other parameters, certain values are only possible for a particular set of parameter values for different parameters. Additional details are provided below.

Figure 1:
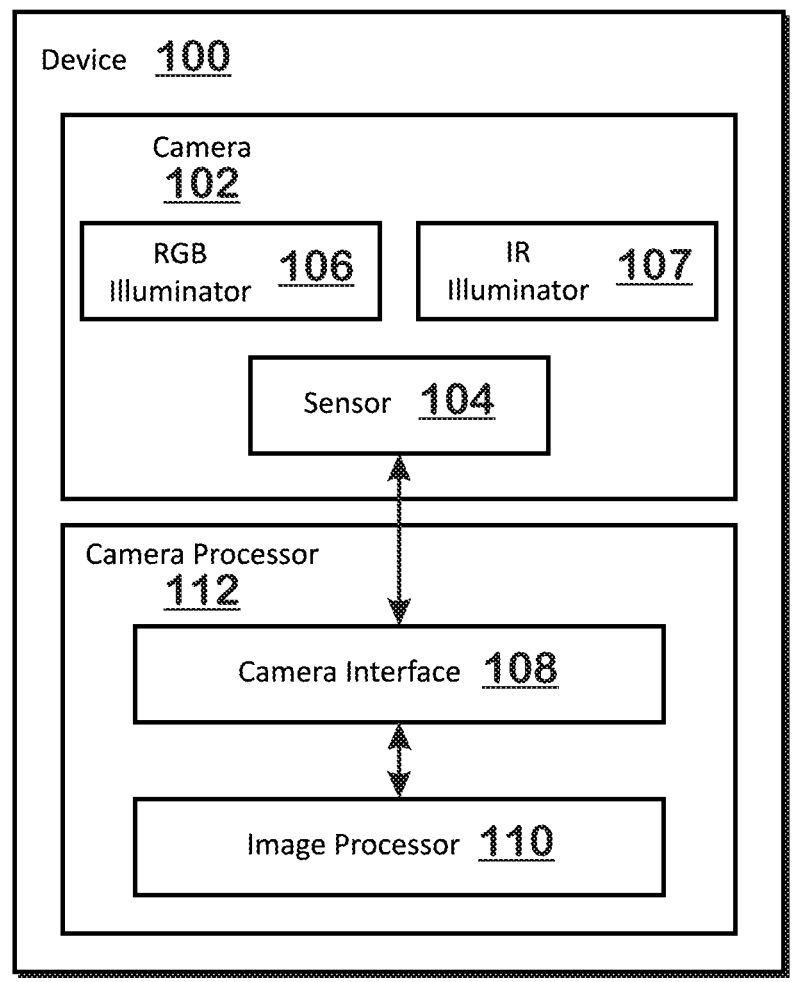
FIG. 1 is a block diagram of a device including a camera and a camera processor, according to an example.

FIG. 1 is a block diagram of a device 100 including a camera 102 and a camera processor 112, according to an example. The camera 102 includes a sensor 104. The sensor 104 includes an array of pixels having multiple sub-pixels. Different sub-pixels are configured to sense light at different wavelengths. In one configuration, different sub-pixels exist for red, green, blue, and infrared (or near-infrared) light so that exposure of the sensor 104 results in signals generated for these various wavelengths of light. The camera 102 also includes an RGB (or "visible light") illuminator 106, which produces light having visible light wavelengths for illumination of an object for sensing by RGB components of sensor 104. The camera 102 further includes an IR illuminator 107, which produces light having infrared or near-infrared wavelengths for illumination of an object for sensing by IR components of sensor 104.

The camera processor 112 includes a camera interface 108 and an image processor 110. The camera interface 108 directly interfaces with the camera 102 and performs actions such as reading raw data from the pixels of the sensor 104, controlling exposure timing, and controlling brightness and enabling of the RGB illuminator 106 and the IR illuminator 107. The image processor 110 processes the raw data fetched by the camera interface 108. This processing includes any of a variety of image processing steps, such as adjustment of brightness or color values for the raw data, decontamination of image, which removes contamination from a variety of sources such as spectral contamination (contamination due to imperfect color filters for the sub-pixels of the sensor 104), optical spatial contamination, which relates to contamination caused by the fact that light may hit the sensor at incorrect pixels depending on the angle of incidence of the light on the sensor 104, and electrical contamination, which results from light incident on a pixel triggering an electrical response on neighboring pixels. Processing by the image processor 110 also includes analyzing the raw data, or processed data, to determine camera parameters such as exposure parameters like shutter speed or aperture size, whether flash illumination is required, and what the flash power should be. The image processor 110 also controls timing parameters for the camera 102, controlling the camera through the camera interface 108. If flash (i.e., RGB illuminator 106 and/or IR illuminator 107) is to be used, the image processor 110 controls enablement and timing of the flash. Timing includes both the delay relative to a flash trigger vertical sync ("VSYNC") signal as well as a flash duration. As described above, the camera 102 can be operated in a number of different modes, each mode defined by a different set of camera mode parameter values for a periodicity camera mode parameter, a simultaneity camera mode parameter, an auto-exposure parameter, a shutter mode parameter, and a frame drop parameter.

FIGS. 2A-2C are timing diagrams illustrating variation of the periodicity camera mode parameter, according to examples. FIG. 2A illustrates a once per single frame timing diagram 200, FIG. 2B illustrates a once over multiple frames timing diagram 210, and FIG. 2C illustrates a periodic flash timing diagram 220. As described above, the periodicity camera mode parameter can be set to one of the three values represented by FIGS. 2A-2C, and controls the timing of flash power-on relative to sensor exposure timing.

The once per single frame timing diagram 200 illustrates a mode in which, during a period in which a flash assert signal is asserted, the flash is fired once for a single frame. The flash assert signal represents a decision made by the image processor 110 that flash illumination is to occur. This decision may be made for a variety of reasons. In one example, this decision is made based on exposure levels calculated by the image processor 110 for a previous frame of sensor exposure. For example, if the frame is too dark, then the image processor 110 determines that flash illumination is desired to increase light levels, and asserts the flash assert signal. In another example, a flash is set to "always on," and thus the image processor 110 asserts the flash assert signal in response. The image processor 110 may de-assert the signal at a later time for any of a variety of reasons.

In the once per single frame timing diagram 200, a flash assert signal causes the flash to be powered on for only one frame until the flash assert signal is de-asserted. Thus, the flash is powered on once per instance of asserting the flash assert signal. For purposes of timing, a flash VSYNC signal and flash trigger signal are illustrated. These signals are generated by the camera interface 108 and serve to regulate timing of when the flash can be triggered in response to the flash assert signal provided by the image processor 110. The flash VSYNC signal is a periodic signal with period equal to that of the sensor exposure period. The flash VSYNC signal is illustrated as being asserted slightly later in time than the beginning of exposure of a sensor frame (which is illustrated as "sensor exposure duration"). The assertion of the flash VSYNC signal causes a flash trigger signal to be asserted, generally for a shorter period than the flash VSYNC signal.

The flash is powered on in response to the first time that a flash trigger signal is asserted while the flash assert signal is asserted, but not in response to any other time that the flash trigger signal is asserted while the flash assert signal is still asserted. After the flash assert signal is de-asserted and re-asserted, the flash is again powered on upon the first instance of the flash trigger signal being asserted, as illustrated in FIG. 2A.

The flash is powered on an amount of time after de-assertion of the flash trigger signal that is referred to as "delay" or the "delay timing parameter," or "delay parameter." The flash is powered on for a duration equal to the flash duration parameter. The delay parameter is set so that the flash begins to be powered on at some point after the beginning of a frame of sensor exposure (as reflected by the "sensor exposure duration" signal). The duration is set based on a variety of factors. The duration may cause the flash assertion to extend from the exposure frame at which the flash begins to be powered on into the next adjacent frame in some instances. This could result in partial illumination for that frame if a rolling shutter is used. However, in modes in which some frames are discarded, it is satisfactory for the next adjacent frame to be partially illuminated, for instance, if that frame is discarded. Discarding of frames, partial illumination of frames, and rolling shutters will be described in more detail below with respect to FIGS. 4 and 5A-5D. If the next adjacent frame is not allowed to be partially illuminated, for example if frames are not periodically discarded, then the duration parameter is set so that the flash is powered on until the end of the frame in which the flash is powered on or until before that time.

FIG. 2B illustrates a once over multiple frames timing diagram 210 that illustrates what occurs when the value for the periodicity camera mode parameter is the once over multiple frames value. In this instance, the flash remains powered on over multiple frames. As with the once for a single frame parameter value, the flash is powered on in response to both the flash assert signal and the flash trigger signal being asserted. A delay value is set to cause the flash to be powered at or after the beginning of a particular exposure frame. The flash is powered off in response to the flash trigger being asserted while the flash assert signal is de-asserted. Thus in FIG. 2B, the third time the flash trigger is asserted, which is while the flash assert signal is de-asserted, the camera interface 108 causes the flash to be powered off. The timing of un-powering of the flash is determined by a flash end time value. This value represents the time after the final flash trigger assertion (which occurs when the flash assert signal is de-asserted) that the flash is powered off. The flash end time is set such that the last frame illuminated is fully and not partially illuminated.

FIG. 2C illustrates the periodic flash timing diagram 220. With the periodic value for the periodicity camera mode parameter, the flash is powered on periodically while the flash assert signal is on. Specifically, the flash is powered on every N frames, where N represents a particular integer one or greater. In FIG. 2C, the particular value for N is 3, because the flash is switched on the first and fourth time the flash trigger is asserted while the flash assert signal is asserted.

Figure 3A:
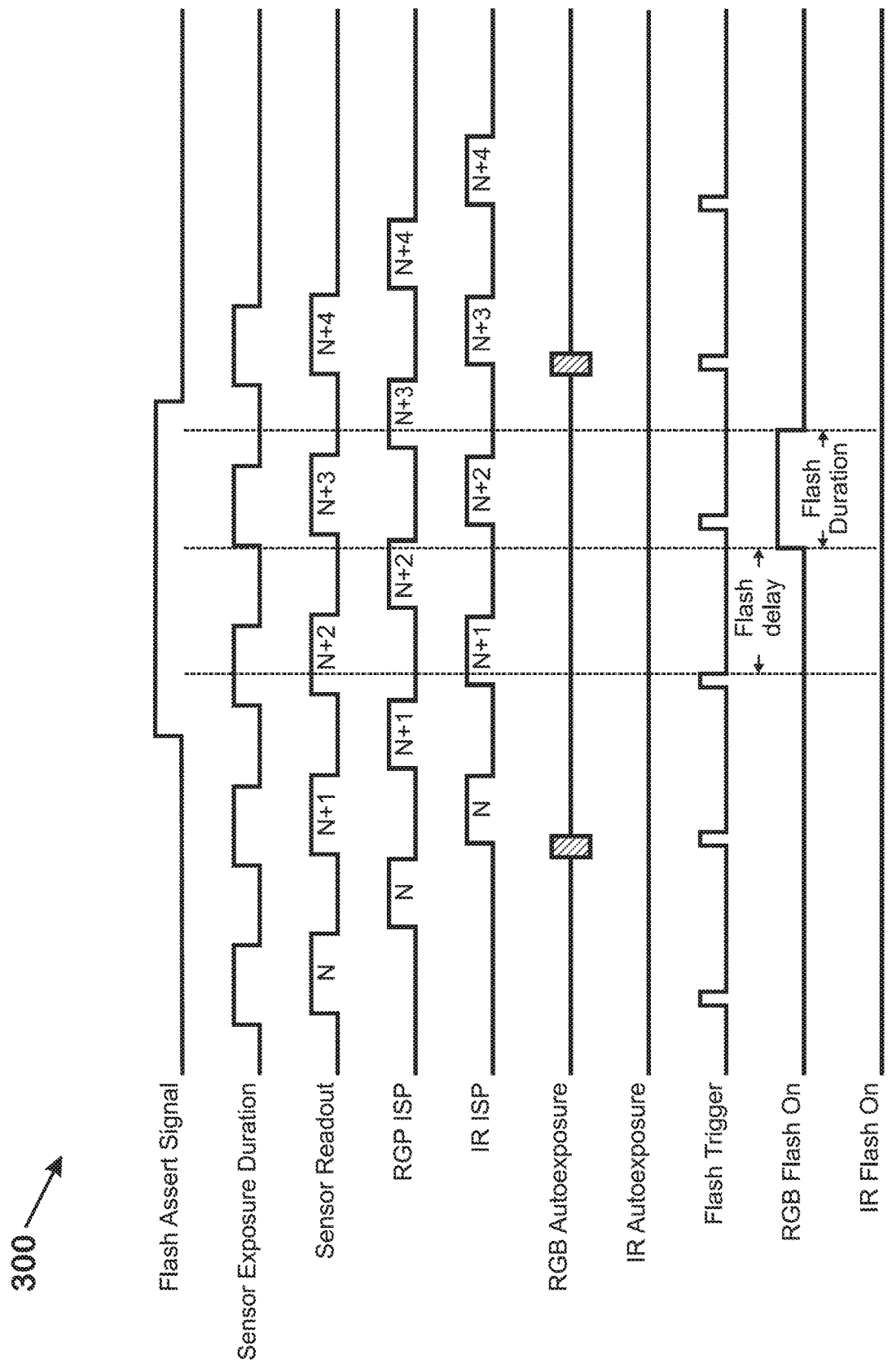
FIGS. 3A and 3B illustrate timing related to auto-exposure calculations and flash control for a sensor readout mode in which both RGB and IR data is used, according to examples.
Figure 3B:
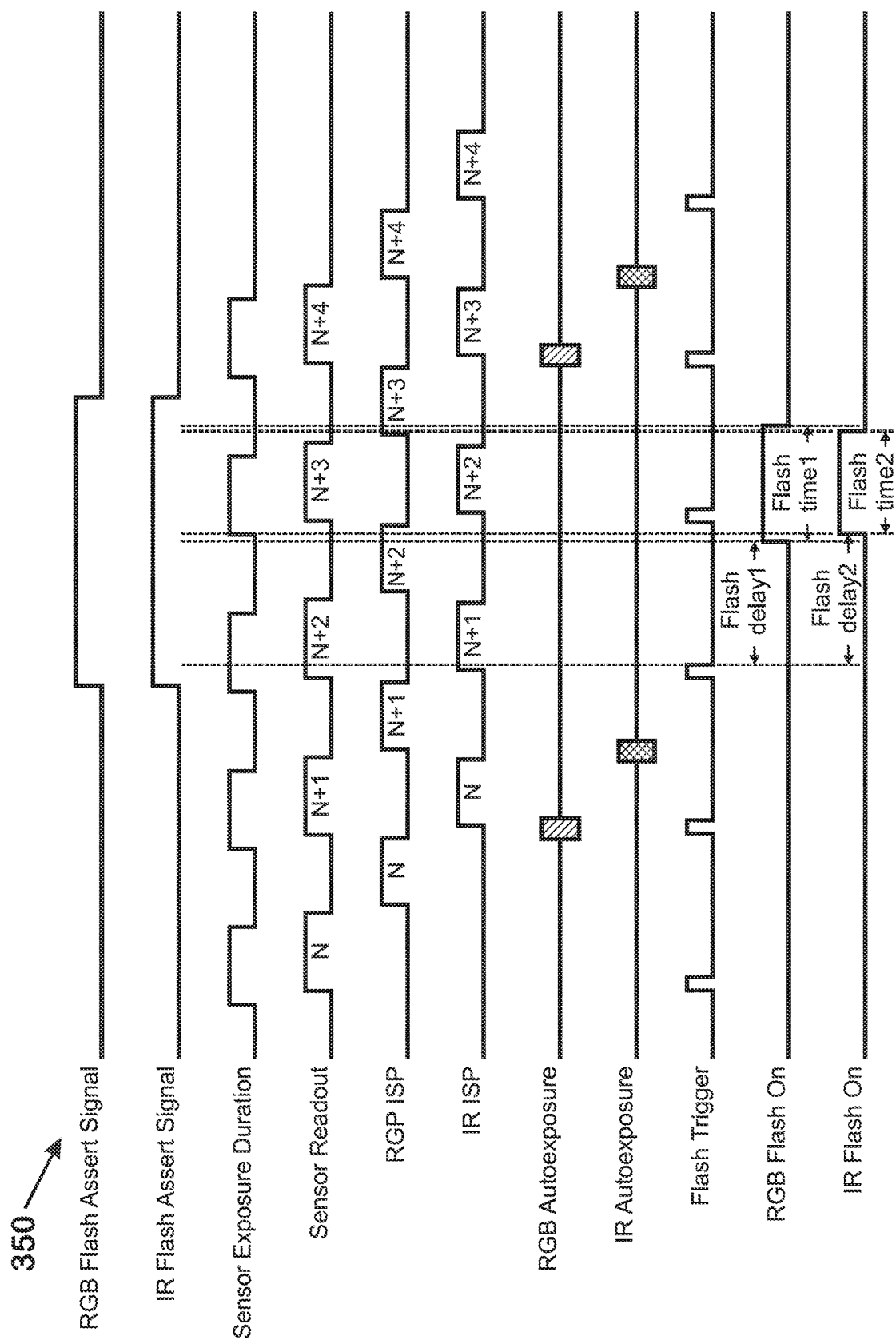

FIGS. 3A and 3B illustrate timing related to auto-exposure calculations and flash control for a sensor readout mode in which both RGB and IR data is used—that is, the simultaneity parameter is set to dual-output reading as opposed to one-output reading, according to examples. In this mode, it is possible for the flash for either or both of RGB and IR to be powered on for any particular sensor frame. In addition to the various signals described with respect to FIGS. 2A-2C, including the exposure duration, and flash trigger, for example, FIGS. 3A and 3B also illustrate a sensor readout signal, an RGB image signal processing ("ISP") signal, an IR ISP signal, an RGB auto-exposure signal, an IR autoexposure signal, an RGB flash on signal, and an IR flash on signal.

In FIG. 3A, autoexposure is based on the RGB values and not on the IR values, although IR values are still read out from the sensor. Thus, an RGB autoexposure signal includes a blip that illustrates an RGB autoexposure calculation. This RGB autoexposure calculation occurs after RGB image signal processing. Note, infrared image processor does not need to occur before the RGB autoexposure calculation occurs. Thus, the RGB autoexposure calculation occurs before the IR ISP begins in the example of FIG. 3A.

The RGB autoexposure calculation results in a determination by the image processor 110 that the visible light flash is to be powered on. In response, the image processor 110 asserts the flash assert signal, which causes the visible light flash to be powered on after the next flash trigger occurs. The visible light flash is powered on at time of the delay parameter after the next flash trigger.

Note, FIG. 3A illustrates an example in which autoexposure is determined based on RGB data and not IR data. However, in an alternative, autoexposure may be set based on IR data and not RGB data.

In FIG. 3B, autoexposure is set based on both RGB and IR data. Illumination may be required for both RGB and IR. Thus, as shown in FIG. 3B, autoexposure calculation for RGB data causes the RGB flash assert signal to be raised and autoexposure calculation for IR data causes the IR flash assert signal to be raised. The RGB flash assert signal causes the visible light flash to be turned on at the time that is a first delay parameter after the flash trigger is set when the RGB flash assert signal is switched on and the IR flash assert signal causes the IR flash to be turned on at the time that is a second delay parameter after the flash trigger is set when the IR flash signal is switch on. Both the first delay parameter and the second delay parameters are adjustable. In one example, these parameters are adjusted to cause the respective flashes to be switched on at or after the beginning of a frame, to avoid partial illumination of a previous frame. If the camera 102 is operating in a mode in which some frames are dropped, then these parameters need not cause the flash to start after a particular frame has started, and can illuminate a prior frame if that prior frame is to be dropped.

Note, the periodicity camera mode parameter in the examples illustrated in FIGS. 3A-3B is set to the once for a single frame value, meaning that while the flash assert signal is high, the flash is powered on only for one frame. However, the periodicity camera mode parameter may be set to any of the values described herein, regardless of whether the sensor is ready simultaneously or in a one-output mode, and, if read simultaneously, regardless of whether autoexposure is performed on the basis of RGB data, IR data, or both.

Figure 4:
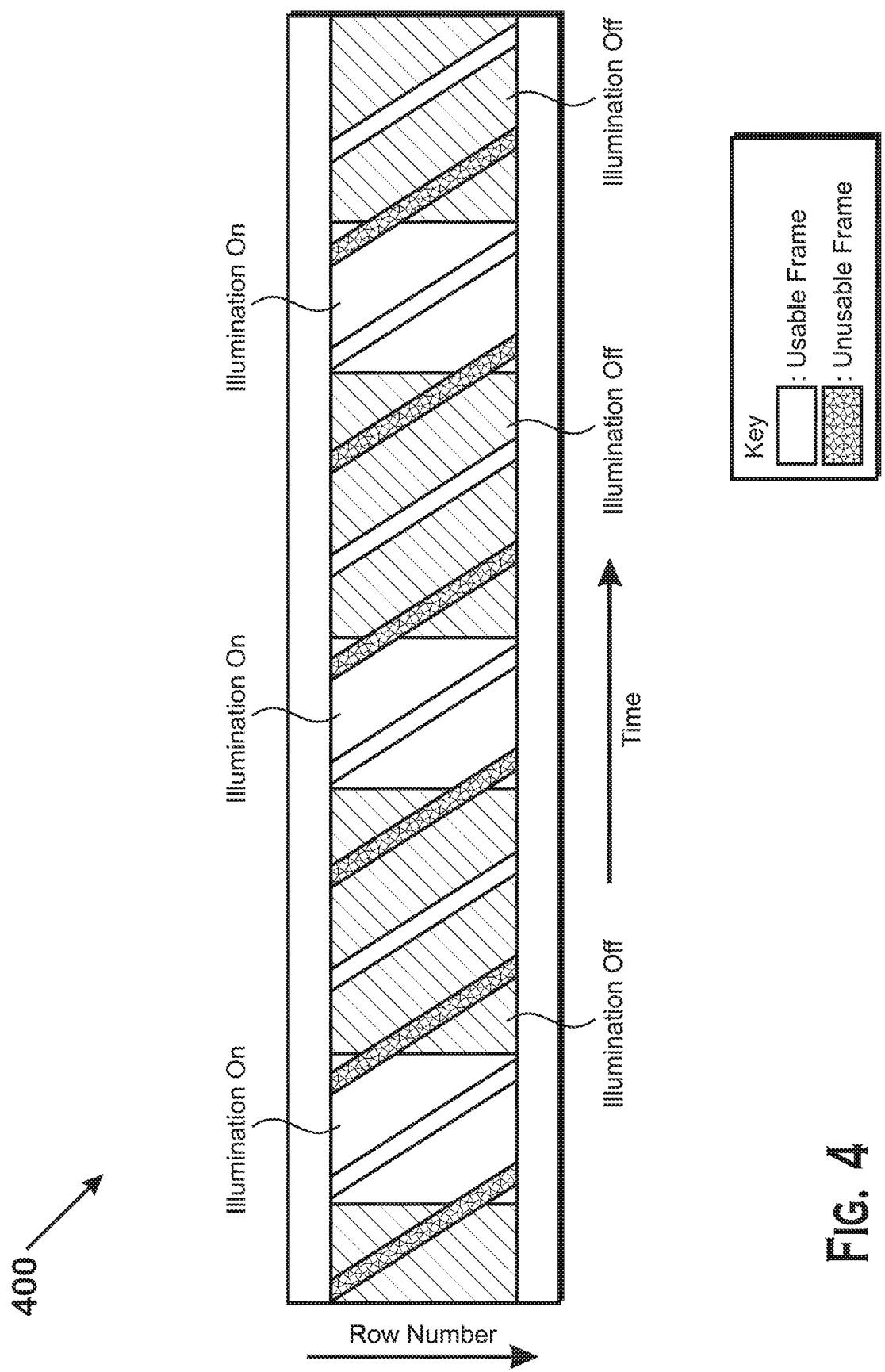
FIG. 4 is a schematic diagram illustrating rolling shutter operation of the camera and the possibility of having partially illuminated frames, according to an example.

FIG. 4 is a schematic diagram illustrating rolling shutter operation of the camera 102 and the possibility of having partially illuminated frames, according to an example. Rolling shutter operation is operation in which different rows of pixels of the sensor 104 are exposed and read out at different times. Exposure continues in row order from one end of the sensor 104 to the other end (e.g., from top to bottom). A frame is composed of row read-outs for all rows of a sensor (or at least for all rows considered to be contributing to the frame). Some rows can be exposing and reading out for one frame while other rows are exposing and reading out for other frames. For example, the last row of an earlier frame can be exposing and reading out at the same time as one of the higher rows of a subsequent frame.

As illustrated in FIG. 4, one issue with rolling shutter is that if illumination is used, then because different rows of the same frame are exposed at different times, some rows could be illuminated while others are not. In graph 400 of FIG. 4, time flows to the right and the row number goes from top to bottom. Each diagonal bar represents a single frame of exposure. The bars are diagonal because different rows are exposed at different times. Graph 400 also illustrates different periods of time in which illumination is on or off. Frames that cross the boundary between when illumination is on and illumination is off are partially illuminated and thus include data that may be considered unusable. Frames that do not cross such a boundary are either full illuminated or fully unilluminated and are thus may be considered "useful" frames.

The auto-exposure modes of FIGS. 3A and 3B are used if the simultaneity parameter is set such that simultaneous readings of RGB and IR data are taken from the sensor 104. If only one kind of reading is taken (either only RGB or only IR), then one of the modes described below with respect to FIGS. 5A-5D is used. One difference between the simultaneous mode and the one-reading mode is that in general, in the simultaneous mode, the flash delay is substantially greater than in the one-reading mode because in the one-reading mode, the flash delay is zero or is a minimal value as described below.

FIGS. 5A-5D illustrate timing diagrams that include features to align flash timings with exposure duration for the purpose of properly illuminating exposure frames, according to examples. FIGS. 5A and 5B illustrate timing graphs for the situation where sequential sensor frames are used and no frames are dropped and FIGS. 5C and 5D illustrate timing graphs for the situation where alternating frames are dropped.

In the graph 500 of FIG. 5A, the sensor is operating in global shutter mode and each frame of sensor exposure (illustrated as alternating high and low signals, although this illustration is just shorthand for denoting different frames) is fully illuminated (or unilluminated) and is not partially illuminated. Note, the high signal may denote the period in which sensor exposure by light causes a signal build-up and the low signal may denote the period in which no signal build-up is occurring, due, for example, to no light being incident on the sensor. To achieve full, and not partial, illumination, the flash is timed to illuminate individual frames. The flash is triggered upon beginning a new sensor exposure frame. At the beginning of a frame (e.g., when the sensor exposure duration rises to high from low in graph 500), the image processor 110 asserts the flash assert signal. Due to the flash trigger signal being asserted, the camera interface 108 causes the flash to be turned on after a delay period after the next flash trigger. In all of FIGS. 5A-5D, the delay period is zero.

More specifically, the image processor 110 sets the delay setting of the flash to be zero or the minimal amount of delay possible and sets the duration of the flash to an appropriate amount of time based on the autoexposure setting and/or other factors, limiting the duration so that the flash does not remain powered on in the beginning of the next frame. Of course, flash could be powered on again for the next frame.

FIG. 5B illustrates a graph 510 for a situation in which the sensor 104 is operated in a rolling shutter mode and in which no frames are dropped. In this situation, the flash for a subsequent frame is triggered by the end of exposure of the last row of the previous frame. Thus, in FIG. 5B, it is shown that the flash assert signal is raised at the end of exposure of the frame that is immediately prior to the first frame shown. The delay is set to zero so that the flash can begin as soon as possible. The duration is set so that the flash is powered off at or before the end of exposure of the first row of the current frame.

The result of triggering the flash upon end of exposure of the last row of the last frame and ending the flash before or at end of exposure of the first row of the current frame is that flash illumination time is equal for all rows of the current frame. This equality ensures that no rows are partially illuminated and thus that proper exposure is achieved. The time in which flash can be powered on without partial illumination of rows in FIG. 5B is illustrated as the "safe" window.

FIGS. 5C and 5D represent the situation in which alternating frames are discarded due to including "dirty" images. More specifically, because of more relaxed timing controls of the flash, some frames are only partially illuminated and thus may not be considered useful. These non-useful frames are discarded.

In graph 520 of FIG. 5C, the shutter 104 is activated globally. Because every other frame is dropped, the flash duration can extend past the end of the frame that the flash is intended to illuminate. Thus, in FIG. 5C, while the delay is set to zero or to some minimal value that allows the flash to begin soon after the frame begins, the duration is set to a value that allows the flash to extend past the end of the frame. Note, the image processor 110 causes the flash assert signal to be raised in response to the current frame beginning. This in turn causes the flash to begin being powered on due to both the flash assert signal and the flash trigger being asserted at the beginning of the frame. The frame delay of zero causes the flash to be powered on soon after the frame begins. The flash duration is set based on autoexposure and/or other settings, to cause the flash to remain powered on until the end of the duration. The duration ends before the beginning of, not the subsequent frame, but the frame after that. The subsequent frame may be partially illuminated and is thus dropped. Dropped frames are indicated with "X's."

In graph 530 of FIG. 5D, the shutter 104 is activated in a rolling manner. The image processor 110 causes the flash assert signal to be raised in response to the current frame beginning, which causes the flash to be powered on soon after the current frame begins. The flash delay is set to zero or to some minimal value to cause this timing to occur. The flash duration is set as desired, but is set to not allow the flash to be powered on at the beginning of not the next frame but the frame after that. Because the next frame may be partially illuminated, that frame is discarded (indicated with an "X").

Figure 6:
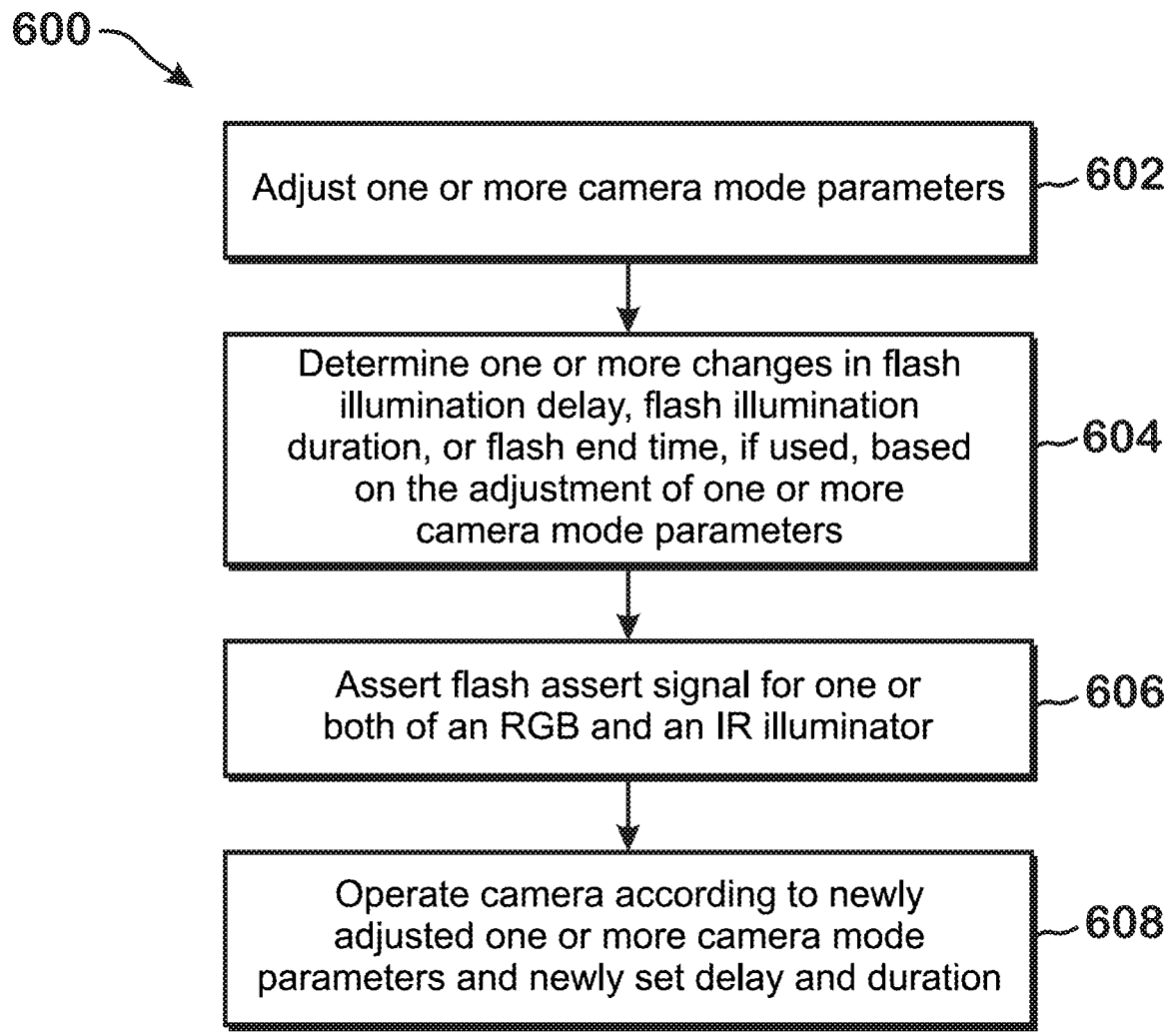
FIG. 6 is a flow diagram of a method for operating a camera according to different camera mode parameter values, according to an example.

FIG. 6 is a flow diagram of a method 600 for operating a camera according to different camera mode parameter values, according to an example. Although described with respect to the system of FIG. 1, which has been described with respect to FIGS. 2A-5D, those of skill in the art will understand that any system configured to perform the method with any technically feasible order of steps falls within the scope of the present disclosure.

As shown, the method 600 begins at step 602, where the camera processor 112 adjusts one or more camera mode parameters. As described above, the camera mode parameters include a flash illumination periodicity parameter, a simultaneity parameter, an autoexposure parameter, a shutter mode parameter, and a frame drop parameter.

At step 604, the camera processor 112 adjusts flash illumination delay and/or flash illumination duration based on the adjustment to the one or more camera mode parameters described above. If the simultaneity parameter is set such that simultaneous RGB and IR readings are taken from the sensor 104 in the same frame, then the delay is set so that either or both of the IR and RGB flashes begin illuminating the subject after the autoexposure has been set for the sensor 104 and to approximately match the beginning of a particular frame. Specifically, because changing camera settings in the sensor 104 in response to autoexposure calculation requires up to several frames of time, the delay is set so that the flash is switched on after the camera settings have been changed. If the simultaneity parameter is set such that only one of RGB or IR readings are taken from the sensor 104, then the delay is set to zero or to a very small value. The flash duration is based on whether a rolling shutter is used (the shutter mode parameter) and on whether frames are to be dropped (the frame drop parameter). If a rolling shutter is used and no frames are to be dropped, then the duration is set such that the illuminator is switched off before the end of exposure of the first row of the frame. If a global shutter is used and no frames are to be dropped, then the duration is set such that the illuminator is switched off before the end of exposure of the frame for which the illuminator is switched on. If a global shutter or rolling shutter is used and frames are to be dropped, then the duration is set such that the illuminator is switched off before the beginning of exposure of the second frame ahead of the frame for which the illuminator is switched on.

At step 606, the image processor 110 asserts the flash assert signal at an appropriate time. If the simultaneity parameter is set such that both infrared and RGB data is obtained from the sensor in one frame, then the flash assert signal is raised at or somewhat prior to the frame for which new exposure settings are to be used based on an autoexposure calculation (but after the beginning of the immediately prior frame to avoid beginning illumination for the frame for which exposure settings have not yet been changed). If the simultaneity parameter is set such that only one of IR or RGB data is taken from the sensor 104 for any given frame, then the time that the image processor 110 asserts the flash assert signal is dependent on whether global or rolling shutter is used and on whether frames are dropped or not. If frames are to be dropped (that is one every other frame is dropped), then the flash assert signal is asserted at the beginning of the frames that are not dropped. If no frames are dropped and a global shutter is used, then the flash assert signal is asserted at the beginning of each frame. If no frames are dropped and a rolling shutter is used, then the flash assert signal is asserted at the end of each frame.

At step 608, the image processor 110 and camera interface 108 operate the camera according to the settings. The flash assert signal causes the flash to be switched on in response to the next flash trigger occurring. The flash is actually powered after the delay period after that flash trigger occurs. The flash remains on for the flash duration, unless the once per multiple frames mode is used, in which case, the flash is switched off a flash end time amount of time after the first flash trigger after the flash assert signal is lowered.

Where appropriate, any of the periodicity modes may be used. For example, when the adjacent frames are being illuminated with flash, the once frame per flash enable signal may be used, with the image processor 110 asserting that signal every frame. Alternatively, the periodically while the flash enable signal is asserted mode may be used, with the flash enable signal being maintained at a high value and the repetition rate being set to one flash per frame ("N"). For the periodically while flash enable signal is asserted mode, if frames are dropped, and thus every other frame is used, the repetition rate can be set to one flash every other frame. For the auto-exposure control modes of FIGS. 3A and 3B, the once per flash enable signal is used in some embodiments.

It should also be understood that although a variety of different camera mode parameters are disclosed herein, cameras having more or fewer camera mode parameters fall within the scope of the present disclosure.

It should be understood that many variations are possible based on the disclosure herein. Although features and elements are described above in particular combinations, each feature or element can be used alone without the other features and elements or in various combinations with or without other features and elements.

The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for operating a camera including a visible light illuminator and an infrared illuminator, the method comprising:
    adjusting one or more camera mode parameters;
    determining one or more changes in one or more of flash illumination delay, flash illumination duration, or flash end time, based on the adjustment of the one or more camera mode parameters;
    asserting a flash assert signal for one or both of the visible light illuminator and the infrared illuminator; and
    triggering flash power-on and flash power-off for a flash based on one or more of the one or more camera mode parameters, the one or more changes of the flash illumination delay, the flash illumination duration, the flash end time, the flash assert signal, and a flash trigger signal, wherein the flash comprises one of the visible light illuminator and the infrared illuminator, wherein triggering flash power-on comprises triggering the flash to be powered on not more than once during an assertion of the flash assert signal and in response to the flash trigger signal being asserted one time or more than one time during the assertion of the flash assert signal.

2. The method of claim 1, wherein:
    adjusting one or more of the camera mode parameters comprises adjusting a periodicity camera mode parameter to have a value of periodic; and
    triggering flash power-on comprises triggering the flash to be powered on periodically while the flash assert signal is asserted.

3. The method of claim 1, wherein:
    adjusting one or more of the camera mode parameters comprises adjusting a simultaneity camera mode parameter to have a value of simultaneous infrared and visible light sensing; and
    triggering flash power-on occurs after autoexposure for one or both of visible light and infrared occurs.

4. The method of claim 1, wherein:
    adjusting one or more of the camera mode parameters comprises adjusting a simultaneity camera mode parameter to have a value of one-output infrared or visible light sensing.

5. The method of claim 4, wherein:
    adjusting one or more of the camera mode parameters comprises adjusting a shutter mode parameter to have a value of rolling shutter and adjusting a frame drop parameter such that no frames are dropped; and
    asserting the flash assert signal occurs at the end of each frame.

6. The method of claim 4, wherein:
    adjusting one or more of the camera mode parameters comprises adjusting a shutter mode parameter to have a value of rolling shutter and adjusting a frame drop parameter such that some frames are dropped; and
    asserting the flash assert signal occurs at the beginning of each frame that is not dropped.

7. The method of claim 4, wherein:
    adjusting one or more of the camera mode parameters comprises adjusting a shutter mode parameter to have a value of global shutter; and
    asserting the flash assert signal occurs at the beginning of each frame.

8. A camera processor for operating a camera including a visible light illuminator and an infrared illuminator, the camera processor comprising:
    an image processor; and
    a camera interface,
    wherein the image processor is configured to:
        adjust one or more camera mode parameters,
        determine one or more changes in one or more of flash illumination delay, flash illumination duration, or flash end time, based on the adjustment of the one or more camera mode parameters, and
        assert a flash assert signal for one or both of the visible light illuminator and the infrared illuminator, and
    wherein the camera interface is configured to trigger flash power-on and flash power-off for a flash based on one or more of the one or more camera mode parameters, the one or more changes of the flash illumination delay, the flash illumination duration, the flash end time, the flash assert signal, and a flash trigger signal, wherein the flash comprises one of the visible light illuminator and the infrared illuminator, wherein triggering flash power-on comprises triggering the flash to be powered on not more than once during an assertion of the flash assert signal and in response to the flash trigger signal being asserted one time or more than one time during the assertion of the flash assert signal.

9. The camera processor of claim 8, wherein:
    the image processor is configured to adjust the one or more camera mode parameters by adjusting a periodicity camera mode parameter to have a value of periodic; and
    the camera interface is configured to trigger flash power-on by triggering the flash to be powered on periodically while the flash assert signal is asserted.

10. The camera processor of claim 8, wherein:
    the image processor is configured to adjust the one or more camera mode parameters by adjusting a simultaneity camera mode parameter to have a value of simultaneous infrared and visible light sensing; and the camera interface is configured to trigger flash power-on after autoexposure for one or both of visible light and infrared occurs.

11. The camera processor of claim 8, wherein:
the image processor is configured to adjust the one or more camera mode parameters by adjusting a simultaneity camera mode parameter to have a value of one-output infrared or visible light sensing.

12. The camera processor of claim 11, wherein:
the image processor is configured to:
adjust the one or more camera mode parameters by adjusting a shutter mode parameter to have a value of rolling shutter and adjusting a frame drop parameter such that no frames are dropped; and
assert the flash assert signal at the end of each frame.

13. The camera processor of claim 11, wherein:
the image processor is configured to:
adjust one or more of the camera mode parameters by adjusting a shutter mode parameter to have a value of rolling shutter and adjusting a frame drop parameter such that some frames are dropped; and
assert the flash assert signal at the beginning of each frame that is not dropped.

14. The image processor of claim 11, wherein:
the image processor is configured to:
adjust one or more of the camera mode parameters by adjusting a shutter mode parameter to have a value of global shutter; and
assert the flash signal at the beginning of each frame.

15. A camera comprising:
a visible light illuminator;
an infrared illuminator; and
a camera processor comprising:
an image processor; and
a camera interface,
wherein the image processor is configured to:
adjust one or more camera mode parameters,
determine one or more changes in one or more of flash illumination delay, flash illumination duration, or flash end time, based on the adjustment of the one or more camera mode parameters, and
assert a flash assert signal for one or both of the visible light illuminator and the infrared illuminator, and
wherein the camera interface is configured to trigger flash power-on and flash power-off for a flash based on one or more of the one or more camera mode parameters, the one or more changes of the flash illumination delay, the flash illumination duration, the flash end time, the flash assert signal, and a flash trigger signal, wherein the flash comprises one of the visible light illuminator and the infrared illuminator, wherein triggering flash power-on comprises triggering the flash to be powered on not more than once during an assertion of the flash assert signal and in response to the flash trigger signal being asserted one time or more than one time during the assertion of the flash assert signal.

* * * * *